United States Patent
Katagiri et al.

[11] Patent Number: 5,878,295
[45] Date of Patent: Mar. 2, 1999

[54] SHADING DEVICE OF A CAMERA HAVING COLLAPSIBLE BELLOWS-LIKE SHADING MEANS

[75] Inventors: Moriya Katagiri, Tachikawa; Tatsuji Higuchi, Akiruno; Tatsuya Suzuki, Tokyo; Koji Kato, Tama; Shunji Matsutani, Akishima, all of Japan

[73] Assignee: Olympus Optical Co., Ltd., Tokyo, Japan

[21] Appl. No.: 643,633

[22] Filed: May 6, 1996

[30] Foreign Application Priority Data

May 10, 1995 [JP] Japan ................................ 7-112083

[51] Int. Cl.$^6$ .................................................. G03B 17/04
[52] U.S. Cl. ............................................ 396/348; 396/341
[58] Field of Search ........................................ 396/341, 348, 396/349, 344–350, 72, 83, 85, 86; 138/121, 122; 348/375

[56] References Cited

U.S. PATENT DOCUMENTS

| | | |
|---|---|---|
| 521,563 | 6/1894 | Delug . |
| 1,110,116 | 9/1914 | Dietz . |
| 1,873,927 | 8/1932 | Goldhammer . |
| 2,516,347 | 7/1950 | Schwartz et al. ............... 95/39 |
| 2,578,111 | 12/1951 | Turner et al. ................... 95/39 |
| 2,886,066 | 5/1959 | Hansen ........................... 138/49 |
| 2,890,637 | 6/1959 | Faulhaber ....................... 95/32 |
| 3,421,425 | 1/1969 | Brandt et al. ................... 95/39 |
| 3,437,025 | 4/1969 | Rice ................................ 95/39 |
| 3,545,358 | 12/1970 | Russell ........................... 95/39 |
| 3,836,933 | 9/1974 | Hochreiter ...................... 95/11 |
| 3,975,750 | 8/1976 | Yoshino et al. ................ 354/225 |
| 4,109,264 | 8/1978 | Pizzuti et al. ................. 354/187 |
| 4,547,053 | 10/1985 | Tobler ........................... 354/187 |
| 4,662,734 | 5/1987 | Nishi ............................. 354/187 |
| 4,728,977 | 3/1988 | Yomogizawa et al. ....... 354/187 |
| 4,768,058 | 8/1988 | Kowalski ........................ 355/8 |
| 4,814,803 | 3/1989 | Wisner ........................... 354/189 |
| 4,962,398 | 10/1990 | Sorg et al. ..................... 354/86 |
| 5,223,981 | 6/1993 | Kaneda .......................... 359/698 |
| 5,363,164 | 11/1994 | Kobayashi et al. .......... 354/195.1 |
| 5,649,251 | 7/1997 | Suzuki et al. ................. 396/341 |

FOREIGN PATENT DOCUMENTS

| | | |
|---|---|---|
| 59-68327 | 5/1984 | Japan . |
| 62-22639 | 2/1987 | Japan . |
| 6-2309 | 1/1994 | Japan . |
| 7-181579 | 7/1995 | Japan . |

*Primary Examiner*—Safet Metjahic
*Assistant Examiner*—John Chizmar
*Attorney, Agent, or Firm*—Louis Weinstein

[57] ABSTRACT

A shading device of a camera having shading bellows which is collapsible in interlocking motion with an imaging-lens barrel movable in the direction of its optical axis and which is provided between the front side of the aperture of a camera body and the imaging-lens barrel, wherein the relationship $L1/L0<L0/L2$ holds where $L0$ represents the free length of the shading bellows when it is formed, $L1$ represents the maximum length of the shading means expanded in the direction of the optical axis and $L2$ represents the minimum length of the shading means contracted in the direction of the optical axis.

4 Claims, 5 Drawing Sheets

SHADING DEVICE OF A CAMERA HAVING COLLAPSIBLE BELLOWS-LIKE SHADING MEANS

BACKGROUND OF THE INVENTION

1. Field of the Invention

The present invention relates to a shading device of a camera having collapsible bellows-like shading means and, more particularly, to a shading device of a camera having bellows-like shading means which is collapsible in interlocking motion with an imaging-lens barrel and which is provided between the front side of the aperture of a camera body and the imaging-lens barrel that moves in the direction of the optical axis.

2. Related Background Art

In the field of compact cameras for picture taking or other purposes, proposed or already put to practical use are a diversity of bellows-like light-cutting means or shading means which is provided between the front side of an exposure opening (hereinafter referred to as "aperture") of a camera body and an imaging-lens barrel movable in the direction of the optical axis, in a manner that allows the shading means to be collapsible in interlocking motion with an imaging-lens barrel, wherein the shading means prevents flare or the like when light from an object coming in through an imaging optical system is reflected off the inner wall of the camera body.

Japanese Laid-open Utility Model Application No. 68327 of 1984 discloses a camera bellows attachment mechanism, in which at least one end of a bellows employed as shading means is provided within a camera body and its opening portion facing the opening of the bellows, or with a fixing member having a joint portion connectable to an imaging-lens barrel, and a locking portion to be locked to the fixing member is provided on the camera body or the imaging-lens barrel, wherein the joint portion and locking portion are put into joining engagement.

According to Japanese Laid-open Utility Model Application No. 68327, however, the bellows employed as the shading means occupies a substantial space within the camera body and provides less freedom in configuration, and depending on the way the bellows is folded, the aperture is barred from fully opening and thus the bellows-like shading means is subject to a limitation in the way it is folded.

OBJECTS AND SUMMARY OF THE INVENTION

Accordingly, it is a first object of the present invention to provide a shading device of camera having a bellows-like shading means which has a collapsible structure and reliably shades light between an imaging-lens barrel and the front of the aperture of a camera body.

It is a second object of the present invention to provide a shading device of camera having a bellows-like shading means which has a compact and collapsible structure with a great deal of freedom allowed in its configuration.

The present invention is characterized in that, in a shading device of a camera having bellows-like shading means which is collapsible in interlocking motion with an imaging-lens barrel movable in the direction of its optical axis and which is provided between the front side of the aperture of a camera body and the imaging-lens barrel, the relationship L1/L0<L0/L2 holds wherein L0 represents the free length of the shaped bellows-like shading means mounted on the camera, L1 represents the maximum usable length of the shading means expanded in the direction of the optical axis and L2 represents the minimum usable length of the shading means contracted in the direction of the optical axis.

The present invention is also characterized in that, in a shading device of a camera having bellows-like shading means collapsible in interlocking motion with the imaging-lens barrel movable in the direction of its optical axis, one end of said bellows-like shading means being connected to the imaging-lens barrel and the other end of said bellows-like shading means being connected to the front side of the aperture of the camera body, said bellows-like shading means has, in the vicinity of its joint portion with the imaging-lens barrel, a flare diaphragm which is projected inwardly from the inner wall of the bellows-like shading means to block light other than image-forming light.

The present invention is also characterized in that, in a shading device of a camera having bellows-like shading means which is collapsible in interlocking motion with the imaging-lens barrel movable in the direction of its optical axis and which is provided between the front side of the aperture of a camera body and the imaging-lens barrel, said bellows-like shading means is constructed of an elastic member and has a satin surface finish.

These and other objects and advantages of the present invention will become further apparent from the following detailed explanation.

The present invention thus provides a shading device of a camera having a bellows-like shading means which has a compact and collapsible structure with a great deal of freedom allowed in its configuration and reliably shades light between an imaging-lens barrel and the front of the aperture of a camera body.

DETAILED DESCRIPTION OF THE PREFERRED EMBODIMENTS

Figure 1:
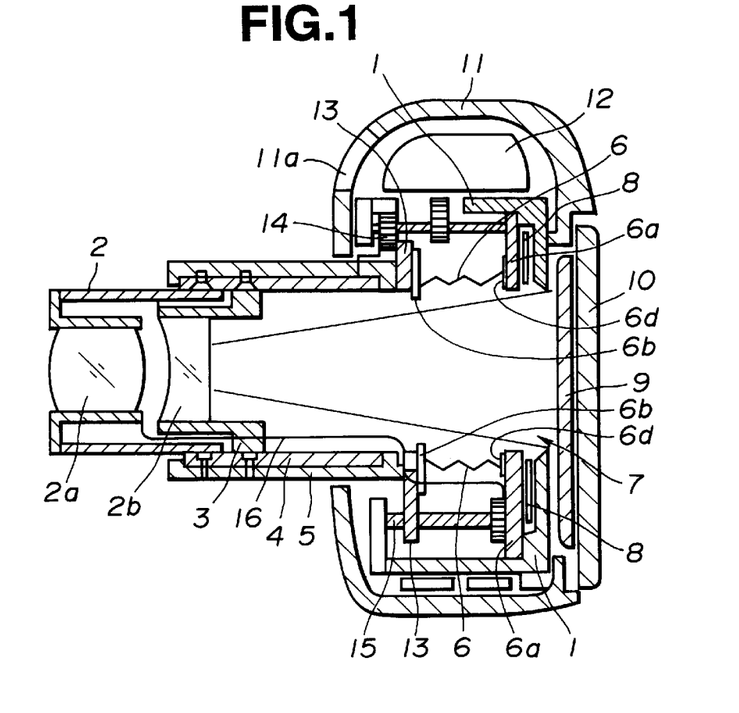
FIG. 1 shows a central horizontal cross-section of a camera according to a first embodiment of the present invention when the camera is viewed from above.

As shown in FIG. 1, the camera body 1 of the first embodiment is generally housed in a plastic outer cover 11, and at the back of the camera body 1 is a rear cover 10 that is constructed of the same material as that of the plastic outer cover 11. The rear cover 10 is supported by the plastic outer cover 11 in a manner that allows the rear cover 10 to be opened and closed. Disposed on the inside of the rear cover 10 is a pressure plate 9, which serves to keep flat the film that is exposed to the image-forming light to develop a picture thereon. The opening and closing of the rear cover 10 is detected by a rear cover opening/closing sensor means (not shown) or the like.

Mounted on the front side of the camera body 1 is an imaging-lens barrel. The imaging-lens barrel supports both a first-group lens 2a and a second-group lens 2b, as an imaging optical system for causing the image-forming light to image. The imaging-lens barrel comprises a first-lens barrel 2 and a second-lens barrel 3, which independently move the lenses 2a, 2b in the direction of the optical axis to perform focus adjustment and magnification setting, and a movable barrel 5, a movable plate 13 and the like for moving the first-lens and second-lens barrels 2, 3.

In the camera of the first embodiment, the imaging optical system housed in the imaging-lens barrel is constructed of a so-called zoom lens that allows photographic magnification to be varied freely. The present invention is not limited to this. Alternatively, the present invention may be equally applied to a single-focus lens or dual-focus lens system.

The movable plate 13 is a thin, planar member having rigidity, such as a metal member, and is secured by means of screws to the rear end of the movable barrel 5 that moves in the direction of the optical axis. A threaded portion (not shown) provided in the movable plate 13 is in mesh with a driving threaded shaft 15 coupled to a driving motor (not shown) or the like mounted inside the camera body 1. The driving motion of the driving motor causes the movable barrel 5 to move back and forth in the direction of the optical axis, thereby retracting or projecting the movable barrel 5 into or out of the camera body 1. Therefore, the camera is so designed that the imaging-lens barrel is retracted into the camera body 1 when the camera is not used or simply carried, and that the imaging-lens barrel is projected out of the camera body 1 when the camera is ready for use.

The first-lens, second-lens barrels 2, 3 are put into cam engagement with the cam groove (not shown) of the cam ring 4 provided on the inner circumference of the movable barrel 5 and with the rectilinear groove of the movable barrel 5. The cam ring 4 is rotated by a driving section 14 made up of gears coupled to a driving motor (not shown) or the like mounted inside the camera body 1 for zooming. The rotary motion of the cam ring 4 causes the first-lens, second-lens barrels 2, 3 to move in the direction of the optical axis, thereby performing magnification setting. Detailed discussion of the construction and operation of the imaging-lens barrel is omitted herein, because it is not directly related to the present invention.

The camera body 1 has in its approximate center an exposure opening (an aperture) 7, and is so designed as to receive the imaging optical system of the imaging-lens barrel at the front of the aperture 7. The camera body 1 is also designed such that the film is positioned behind the aperture 7. In this arrangement, the image-forming light incident to the imaging optical system of the imaging-lens barrel enters the aperture 7, and is directed onto the film behind the aperture 7.

The camera body 1 is provided with a panoramic mask 8 (hereinafter referred to as P mask) which shades the top and bottom portions of the aperture 7 to modify the area of exposure on the film. The P mask 8 is upwardly and downwardly slidably supported relative to the aperture 7.

When it is retracted out of the aperture 7, the P mask 8 results in an exposure area of normal size, 24 mm×36 mm, of 35 mm full frame. When it is projected to shade the top and bottom portions of the aperture 7, the P mask results in an exposure area of panoramic size (approximately 12 mm×36 mm).

The present invention also applies to a typically available camera having an exposure area of normal size, 24 mm×36 mm, of 35 mm full frame only, without the above mechanism incorporated.

A bellows plate 6a constructed of a black-painted metal plate or the like is secured to the camera body 1 by screws in front of the P mask 8.

Disposed at the front of the bellows plate 6a, namely, between the front of the aperture 7 and the imaging-lens barrel movable in the direction of the optical axis, is a bellows section made up of a bellows 6 and the like as shading means which is collapsible in interlocking motion with the imaging-lens barrel and which has a tube-like configuration approximately rectangular at its cross section.

The bellows section is made up of the bellows 6, a rear-end flange face 6d at its rear side, and a front-end flange face 6b at its front side, wherein the rear-end flange face 6d of the bellows 6 is bonded to the front side of the bellows plate 6a, and the front-end flange face 6b of the bellows 6 is bonded to the movable plate 13.

Interconnect means 16 as signal transmission means constructed of a flexible printed circuit board (FPC), lead wires and the like, electrically connects the camera body 1 to the first-lens barrel 2 to transmit electrical signals therebetween. The interconnect means 16 is positioned outside the bellows 6 and routed around the bellows 6.

The camera body 1 has on one side a viewfinder section 12 made up of a viewfinder optical system, a finder window 11a and the like, and the viewfinder section 12 achieves magnification setting of its viewfinder optical system in interlocking motion with the magnification setting of the imaging optical system. Detailed discussion of the construction and operation of the members of the viewfinder section 12 is omitted, because it is not directly related to the present invention.

Figure 2:
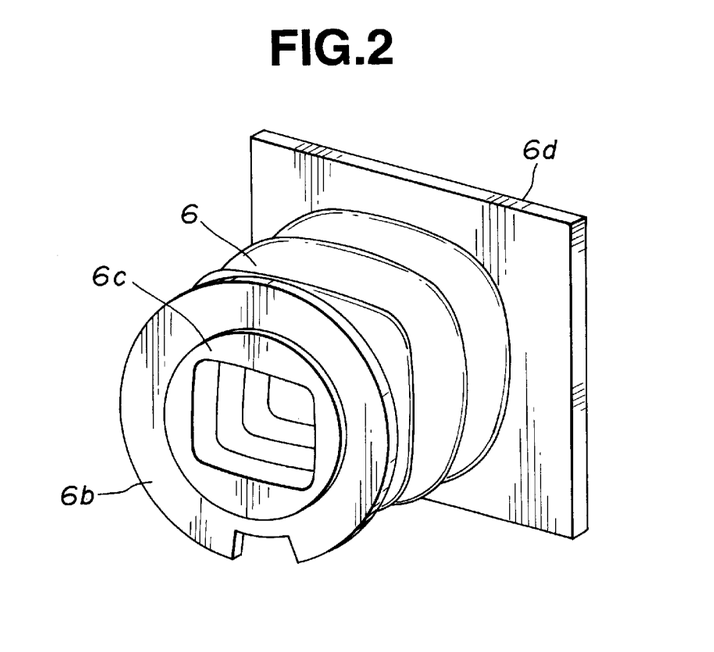
FIG. 2 is an enlarged perspective view of the shading means (a bellows) removed from the shading device of the camera of FIG. 1.

Referring to FIG. 2, the bellows 6 is now discussed in detail.

As already described, the tube-like bellows 6 approximately rectangular at its cross-section is supported between its rear-end flange face 6d at the rear side and the front-end flange face 6b at the front side in a manner that allows the bellows 6 to expand or contract therebetween.

The bellows 6 is constructed of a material having elasticity and pliability, such as a black silicone rubber having a rubber hardness of 30 to 60, and an anti-sticking finish, such as a satin surface finish (SA), is applied to almost the entire outer surface of the bellows 6 except for its bonding faces. This arrangement prevents the outer surfaces of the bellows 6 from sticking together when it is contracted. Further, the inner surface of the bellows 6 has an anti-sticking finish, such a satin surface finish (SA) to prevent light coming in through the imaging optical system from reflecting off and thereby avoiding flare or the like.

The front-end flange face 6b of the bellows 6 has its opening at a position where the front-end flange face 6b does not shade the imaging light of the imaging optical system. Provided inside the front-end flange face 6b is a flange-like flare diaphragm 6c which, in the vicinity of its joint portion with the imaging-lens barrel, is projected inwardly from the inner wall of the bellows 6 to shade light other than the imaging light flux and to present a predetermined opening to the image-forming light flux.

Figure 3:
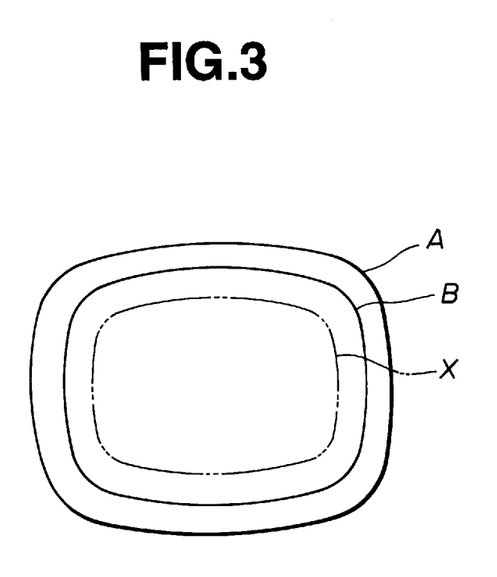
FIG. 3 is a diagrammatic front view of the bellows of FIG. 1, showing crests A and troughs B of the bellows and the outline of the imaging light flux of an imaging optical system.

FIG. 3 shows crests A and troughs B of the bellows 6 and the outline of the imaging light flux of the imaging optical system, and other components are not shown here for simplicity.

The bellows 6 is mounted at a position where its crests A and troughs B do not shade the imaging light of the imaging optical system, namely are clear of the outline of the aperture 7. Therefore, the bellows portion (the crests A and the troughs B) of the bellows 6 is formed such that it is collapsed outside the outline X of the imaging light flux coming in through the imaging optical system.

Figure 4:
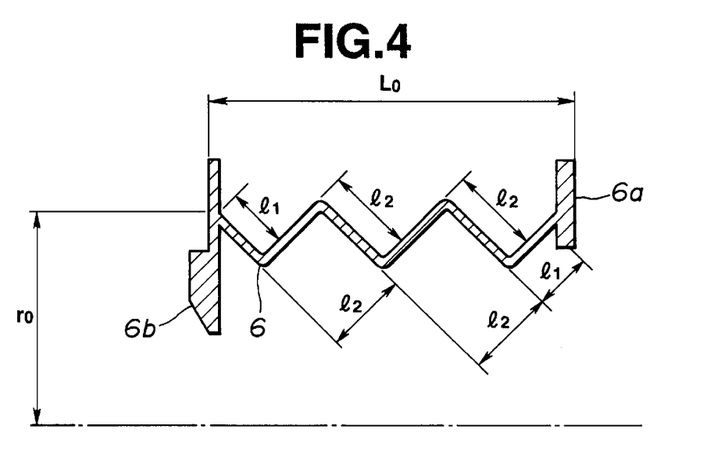
FIG. 4 is a vertical cross-sectional view of the upper half of the bellows at its free state, illustrating the collapsing motion of the bellows of FIG. 1.

As shown in FIG. 4, the length l1 of the foremost segment and backmost segment of the bellows 6 is set to be shorter than the length l2 of the rest of the segments of the bellows 6 (l1<l2).

The anchor points of the bellows 6 as the points of application of force, namely the bonding point between the front-end flange face 6b of the bellows 6 and the movable plate 13, or the bonding point between the rear-end flange face 6d of the bellows 6 and the bellows plate 6a, are spaced by a distance ro from the optical axis and are approximately in the middle level between the peak points of the crests of the bellows 6 and the dip points of the troughs of the bellows 6.

If the anchor points of the bellows 6 are close to the peak points of the crests or close to the dip points of the troughs in the bellows 6, the neighboring troughs or crests will be projected inwardly or outwardly when the bellows 6 is contracted.

Sandwiched between the movable plate 13 and the bellows plate 6a, the bellows 6 is assembled at a predetermined position. If the neighboring crests or troughs are projected more in the course of collapsing action, power requirement for collapsing the bellows 6 accordingly increases. This imposes an increased load on the driving motor.

In the first embodiment of the bellows 6, the above-described arrangement prevents such a problem.

Figure 5:
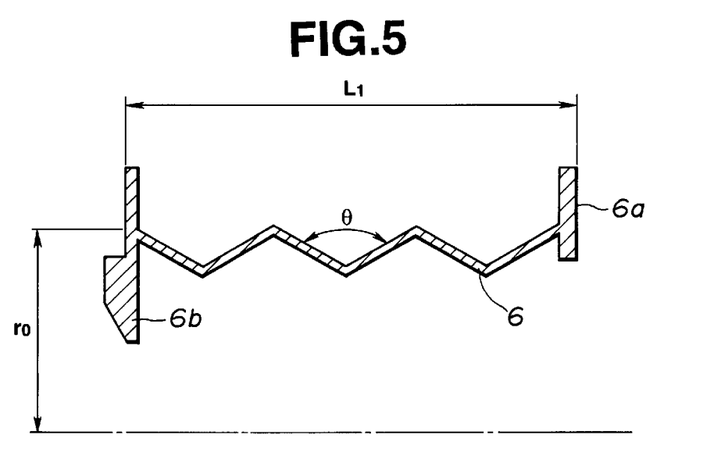
FIG. 5 is a vertical cross-sectional view of the upper half of the bellows at its fully expanded state, illustrating the collapsing motion of the bellows of FIG. 1.
Figure 6:
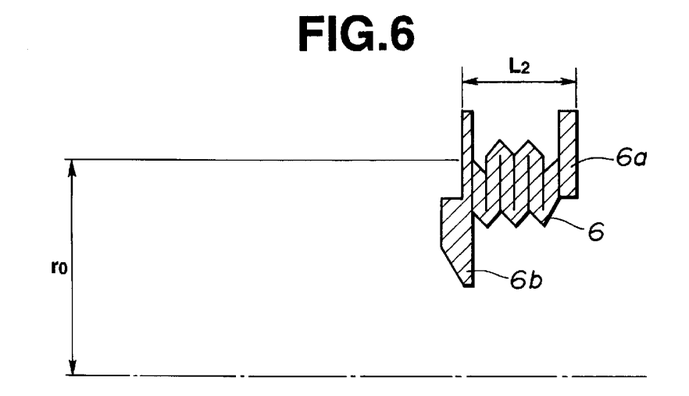
FIG. 6 is a vertical cross-sectional view of the upper half of the bellows at its fully contracted state, illustrating the collapsing motion of the bellows of FIG. 1.

Furthermore, the bellows 6 is designed such that the relationship, $$L1/L0 < L0/L2$$

holds, where L0 represents the free length of the shading means (as shown in FIG. 4), L1 represents the maximum usable length of the shading means when it is expanded in the direction of the optical axis (as shown in FIG. 5) and L2 represents the minimum usable length of the shading means when it is contracted the direction of the optical axis (as shown in FIG. 6).

Discussed next is the operation of the camera shading device of the first embodiment thus constructed.

In the imaging optical system of the camera according to the first embodiment, a zoom lens is employed, and the imaging-lens barrel having the imaging optical system is retracted into the camera body 1 when the camera is not used or simply being carried.

To photograph, the imaging-lens barrel is projected out of its retracted state to be ready for use by operating the main power switch (not shown) or the like mounted on the outer cover 11. In the course of this action, the imaging-lens barrel moves in the direction of the optical axis, and the bellows 6 expands in the direction of expansion in interlocking motion with the imaging-lens barrel.

When the rear cover 10 is opened with the imaging-lens barrel in its expanded state, namely projected out of the camera body 1, control means (not shown) that controls generally the camera detects the position of the imaging-lens barrel with lens position sensor means (not shown), while at the same time sensing the opening of the rear cover 10 with the rear cover opening/closing sensor means (not shown) provided in the vicinity of the rear cover 10 inside the camera body 1, and the control means activates the driving motor to put the imaging-lens barrel into its retracted state. The bellows 6 contracts in the direction of contraction in interlocking motion with the retraction (collapsing) action of the imaging-lens barrel.

With the camera ready for use, namely with the imaging-lens barrel projected out of the camera body 1, as described above, a stray light and the like can enter through a clearance between the outer cover 11 of the camera and the movable plate 13 into the camera body 1.

Since the aperture 7 of the camera is shaded by the bellows 6 in an assured manner inside the camera body 1, the stray light and the like are prevented from reaching the film disposed behind the aperture 7.

As already described, the bellows 6 is disposed between the front of the aperture 7 and the end of the movable barrel 5 that constitutes the imaging-lens barrel, and is thus fully housed inside the camera body 1. The maximum usable length L1 of the bellows 6 in its fully expanded state (as shown in FIG. 5) is determined by the depth dimension of the camera, and L1 therefore ranges from about 10 mm to 40 mm.

The minimum length L2 of the bellows 6 in its fully contracted state (as shown in FIG. 6) is determined by the thickness of the material of the bellows 6 times the number of folds of the bellows 6. The thickness of the bellows 6 should be at least 0.15 mm to 0.4 mm when the bellows is made of silicone rubber or the like.

The opening angle θ of the segments with the bellows 6 at its fully expanded state is designed to be approximately 120° in consideration of possible buckling that could take place in the bellows 6 in its fully expanded state when a load working on the bellows 6 in perpendicular to the direction of expansion is large.

The length of each segment 1, now represented by l2 of the center portion of the bellows 6 with the length l1 of the segments close to the anchor points shown in FIG. 4 neglected for simplicity, should be at least 2 mm or so to accommodate collapsed deformation. When the size of the camera is considered, the length l is preferably less than 4 mm or so.

When the maximum expanded length L1=about 10 mm, the number N of folds in the bellows portion of the bellows 6 is $$N \geq L1 \div l \cdot \sin(120°/2)$$
$$= 10 \div 4 \cdot \sin 60°$$
$$\approx 3$$

Thus, the minimum number of folds (MIN) is 3 or greater.

When the maximum expanded length L1=about 40 mm, $$N \geq L1 \div l \cdot \sin(120°/2)$$
$$= 40 \div 2 \cdot \sin 60°$$
$$\approx 23$$

Thus, the maximum number N of folds (MAX) is 23 or smaller.

The contracted length L2 corresponds to the number of folds N=5–25 with one foremost segment and one backmost segment added.

When the thickness of 0.15 mm by the number of folds 5 through 25, the contracted length L2 of the bellows 6 ranges from L2=approximately 0.75 mm (MIN) with the expanded length L1=approximately 10 mm to L2=approximately 3.75 mm (MAX) with the expanded length L1=approximately 40 mm.

With the thickness of the bellows 6 at approximately 0.15 mm, L1/L2 ranges from 10.7 to 13.3, and with the thickness of the bellows 6 at approximately 0.4 mm, L1/L2 ranges from 4.0 to 5. Namely, the thicker the bellows 6, the value L1/L2 gets smaller. The range of the value L1/L2 is preferably $3 \leq L1/L2 \leq 15$.

Built-in power supplies employed in ordinary cameras are typically size AA, size AAA dry cells and lithium cells, and these power supplies drive a miniature motor for magnification setting and collapsing action of the imaging-lens barrel.

When selecting the material of the bellows 6, the load imposed on the battery power supply, driving motor and the like, and the speed of the motion of the imaging-lens barrel should be considered.

Figure 7:
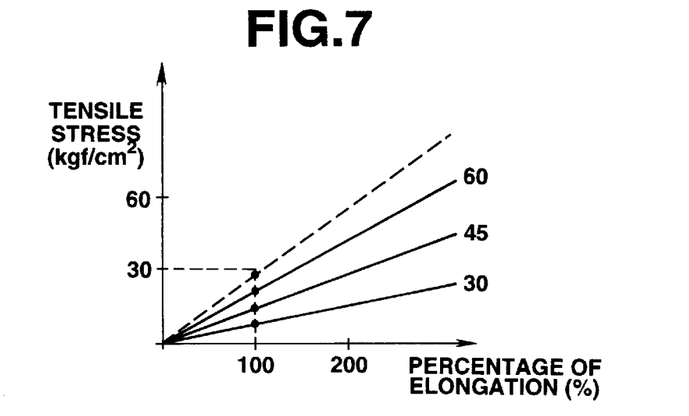
FIG. 7 is a diagram showing elasticity modulus of a silicone rubber preferred as the material of the shading means (bellows) of the camera shading device of FIG. 1.

In FIG. 7, the abscissa represents percentage of elongation (%) and the ordinate represents tensile strength ($kgf/cm^2$). When as shown in FIG. 7, a percentage of elongation of 100% is achieved, a silicone rubber of hardness of 30 gives approximately 6 $kgf/cm^2$, a silicone rubber of hardness of 45 gives approximately 14 $kgf/cm^2$ and a silicone rubber of hardness of 60 gives approximately 21 $kgf/cm^2$.

When the silicone rubber is employed as the material for the bellows 6, there is a tendency that the larger the tensile strength, the greater the power requirement for expansion and contraction involved becomes.

In consideration of this, preferred hardness of the silicone rubber as the material for the bellows 6 gives a tensile stress of 30 $kgf/cm^2$ (represented by the broken line in FIG. 7) or less at a percentage of elongation 100%.

According to the first embodiment, the bellows 6 shades the aperture 7 of the camera in an assured manner to prevent a stray light from entering into the camera body 1 through a clearance between the outer cover 11 of the camera and the movable plate 13 when the camera is set ready for use. Thus, the effect of unwanted light such as a stray light on the film is reliably prevented.

By routing the interconnect means 16 outside the bellows 6 as the shading means, flare that could take place arising from light reflected off the surface of the interconnect means 16 is avoided.

If the bellows 6 as the shading means is not provided, or if the interconnect means 16 is routed inside the bellows 6 as the shading means, light coming in through the imaging optical system is reflected off the surface of the interconnect means 16, producing flare thereon. Flare adversely affects a picture the film develops. According to the first embodiment, by means of the bellows 6 as the shading means prevents, no flare takes place on the interconnect means 16.

Even if stray light coming in through the imaging optical system of the camera enters along the interconnect means 16, the stray light is assuredly shaded because the interconnect means 16 is routed outside the bellows 6 as the shading means.

Furthermore, since the anchor points of the bellows 6 as the points of application of force are positioned approximately in the middle level between the crests and the troughs, projection of the neighboring troughs or crests is prevented. This arrangement reduces power requirement for needed for collapsing action of the bellows 6, lessening the load on the driving motor and the like.

In the first embodiment, the front end and rear end of the bellows 6 as the shading means are connected, respectively, to the movable plate 13 at the rear end of the imaging-lens barrel and to the bellows plate 6a at the front of the aperture. The present invention is not limited to this arrangement. Alternatively, the bellows 6 along with the movable plate 13 and the bellows plate 6a may be integrally formed into a unitary rubber structure through injection molding or insert molding.

The outer surface of the bellows 6 has a satin surface finish in the first embodiment. The present invention is not limited to this arrangement. Alternatively, the application of painting having lubricating quality equally works.

The inner surface of the bellows 6 has a satin surface finish in the first embodiment. The present invention is not limited to this arrangement. Alternatively, non-reflective coating employing matte painting works equally well.

In large-format cameras such as folding cameras and field cameras, bellows-like shading means made of leather, cloth, paper or the like is typically used to shade the clearance between the joint portion (lens board or the like) of an imaging optical system and a camera body.

The bellows-like shading means employed in these large-format cameras is typically square in its cross-sectional shape in perpendicular to the optical axis.

Figure 8:
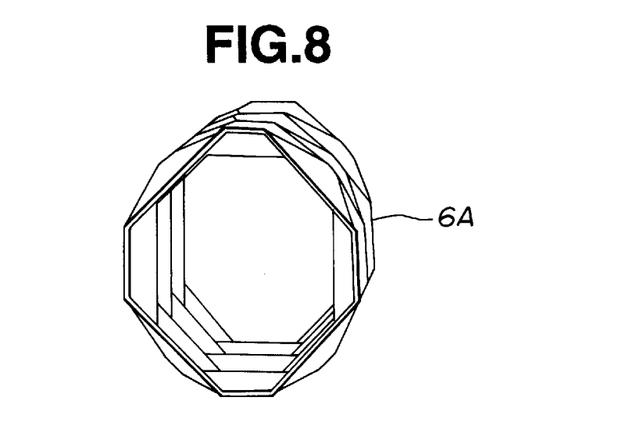
FIG. 8 shows a camera shading device as an alternate example of the first embodiment of the present invention.
Figure 9:
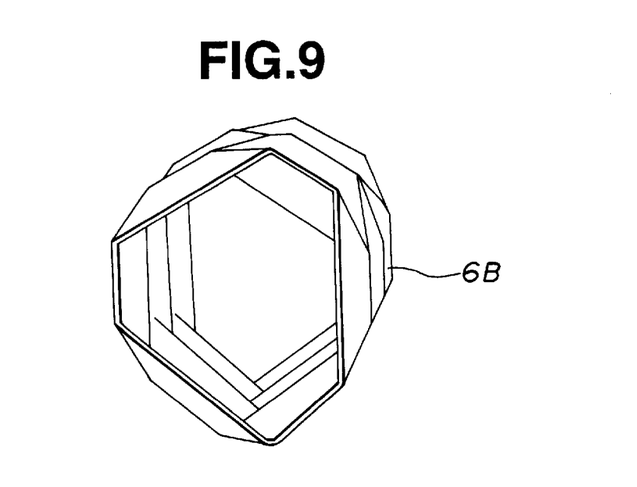
FIG. 9 shows a camera shading device as another alternate example of the first embodiment of the present invention.

By making the bellows-like shading means polygonal in its cross-section as shown in FIGS. 8 and 9, the shading means itself is miniaturized, and the space occupied by the shading means inside the camera body 1 is accordingly reduced and the polygonal shading means thus contributes to a compact design of the entire camera.

In the bellows 6A, 6B polygonal in their cross-section as shown in FIGS. 8 and 9, their corner portions are overlapped when they are contracted with the bellows portions folded, increasing the number of folds and occupying a slightly larger space. The minimum contracted length of the bellows 6B (L2) is slightly lengthened. In the above bellows portions, however, each fold around is formed such that one crest is diagonally opposite to a corresponding trough, and thus rigidity is heightened in the mechanical point of view.

In the first embodiment, the cross-section of the bellows 6 is approximately square.

When the bellows 6 having an approximately square cross-section is collapsed, rigidity at the four corners is high and thus resistance in collapsing action is accordingly high. With the bellows 6 expanded beyond a threshold, the four corners may be forced to sag internally with projected portions recessed and the bellows 6 may be buckled.

The bellows 6 is preferably formed with its shape straightened beforehand so that, during use, deformation at its expanded state is minimized and deformation at its contracted state is maximized.

Namely, buckling that may take place with the bellows extended excessively is controlled by designing the bellows so that deformation at its expanded state is minimized.

With deformation at the contracted state maximized, sagging of the four corners is restrained by neighboring bellows portion. When the bellows is contracted to the extent that the segments of the bellows are pressed together, the bellows is sandwiched between the movable plate and the bellows plate, and thus no buckling takes place in the bellows.

To house the bellows 6 inside the camera body 1, the space occupied by the bellows 6 should be kept to a minimum. If the cross-sectional shape of the bellows is approximately square, unused space results because the imaging light flux has an approximately circular cross-section.

Figure 10:
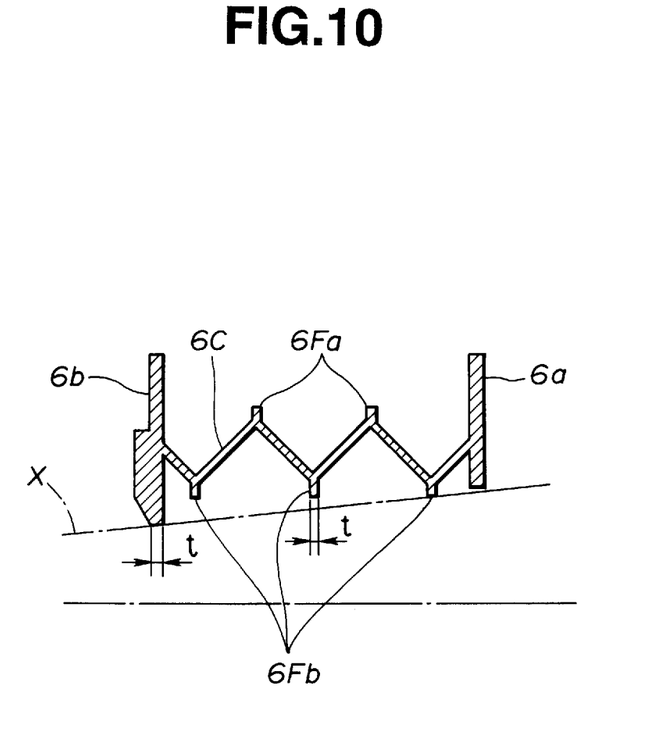
FIG. 10 is a cross-sectional view of the upper half of the shading means (bellows) of the camera shading device according to a second embodiment of the present invention.

Referring to FIG. 10, the camera shading device according to the second embodiment of the present invention is now discussed. FIG. 10 shows only the upper half of the bellows and the lower half of the bellows, approximately symmetrically constructed, is not shown. The second embodiment is almost identical the first embodiment, except that a modification is incorporated in the shape of the bellows as the shading means in the second embodiment.

As shown in FIG. 10, in the bellows 6C as the shading means of the camera shading device of the second embodiment, the crests of the bellows 6C are, at their peak points, integrally formed with outer flange portions 6F*a*, and the troughs of the bellows 6C are, at their dip points, integrally formed with inner flange portions 6F*b*.

If the thickness t of the inner flange portions 6F*b* is designed to be thinner than about 0.1 mm, for example, a rubber as the material for the inner flange may fail to fill sufficiently, and, as a result, the shape of the inner flange may not be clearly formed.

If the thickness t of the inner flange portions 6F*b* is designed to be thicker than about 0.5 mm, for example, light reflected off the inner flange portions will be increased and unwanted light such as flare will be accordingly increased.

The thickness t of the inner flange portions 6F*b* is preferably about 0.2 mm.

According to the second embodiment, as described above, by integrally forming the outer flange portions 6F*a* on the crests of the bellows 6C outside the bellows 6C, buckling-resistant, high rigidity is imparted to the folded portions of the bellows. The bellows 6C is thus prevented from buckling.

By integrally forming the inner flange portions 6F*b* on the troughs of the bellows 6C inside the bellows 6C, light reflection inside the bellows is prevented and flare and the like are thus avoided.

In this invention, it is apparent that working modes different in a wide range can be formed on the basis of this invention without departing from the spirit and scope of the invention. This invention is not restricted by any specific embodiment except as may be limited by the appended claims.

What is claimed is:

1. A shading device of a camera having bellows-like shading means collapsible in interlocking motion with an imaging-lens barrel movable in a direction of an optical axis, one end of said shading means being connected to the imaging-lens barrel and another end of said shading means being connected to an aperture of a camera body, said shading means being constructed of one of an elastic material and a pliable material, a bellows portion of said shading means is formed of crests, each fully extending around the optical axis, and troughs, each fully extending around the optical axis, wherein each crest and each trough alternate in the direction of the optical axis, and said shading means is provided with a flange portion that is integrally formed with each trough in a vicinity of a bottom end of said trough and that projects inwardly inside the bellows portion, said flange portion being a solid integral member extending inwardly from said bottom end of the trough.

2. A shading device of a camera having bellows-like shading means collapsible in interlocking motion with an imaging-lens barrel movable in a direction of an optical axis under control of an electric motor, one end of said shading means being connected to the imaging-lens barrel and another end of said shading means being connected to a front of an aperture of a camera body, wherein said shading means is constructed of one of an elastic material and a pliable material, a bellows portion of said shading means is formed of crests, each fully extending around the optical axis and troughs, each fully extending around the optical axis, wherein each crest and each trough alternate in the direction of the optical axis, and the shading means has an anti-sticking surface finish provided thereon that prevents engageable surfaces of the shading means from sticking together when the shading means is contracted with engageable surfaces of the bellows portion pressed substantially in contact, said anti-sticking surface finish being selected so as not to degrade the elasticity or pliability of the bellows material.

3. The shading device of a camera according to claim 2, wherein said anti-sticking surface finish is a satin surface finish (in a state of fine surface-roughness).

4. The shading device of a camera according to claim 2, wherein said anti-sticking surface finish is an application of a paint having a lubricating quality.

* * * * *

UNITED STATES PATENT AND TRADEMARK OFFICE
CERTIFICATE OF CORRECTION

PATENT NO : 5,878,295
DATED : March 2, 1999
INVENTOR(S) : Katagiri, et al

It is certified that error appears in the above-identified patent and that said Letters Patent are hereby corrected as shown below:

At column 7, line 4, delete the words "$N \geq L1 \div l \cdot \sin(120°/2)$" and insert therefor --$N \leq L1 \div l \cdot \sin(120°/2)$--.

Signed and Sealed this

First Day of May, 2001

*Attest:*

NICHOLAS P. GODICI

*Attesting Officer*  *Acting Director of the United States Patent and Trademark Office*